United States Patent Office 2,929,578
Patented Mar. 22, 1960

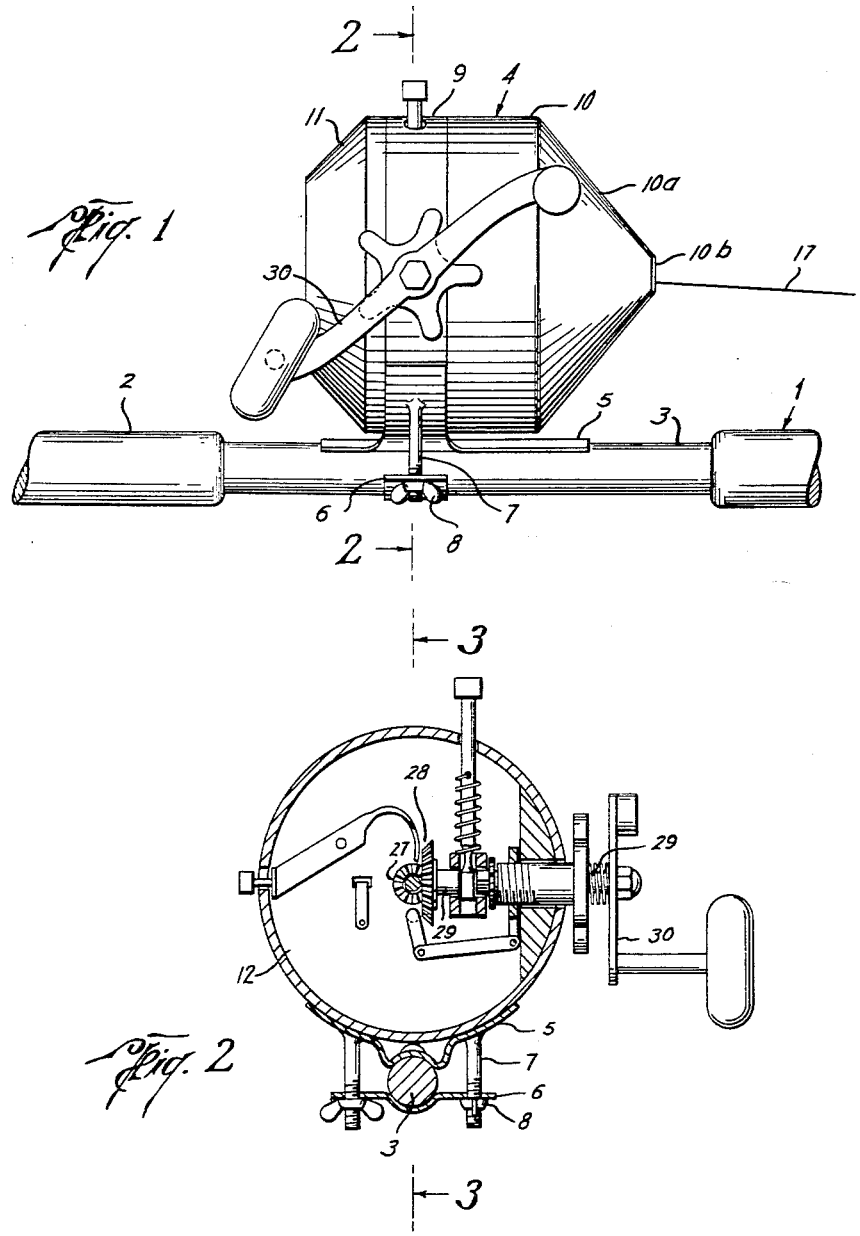

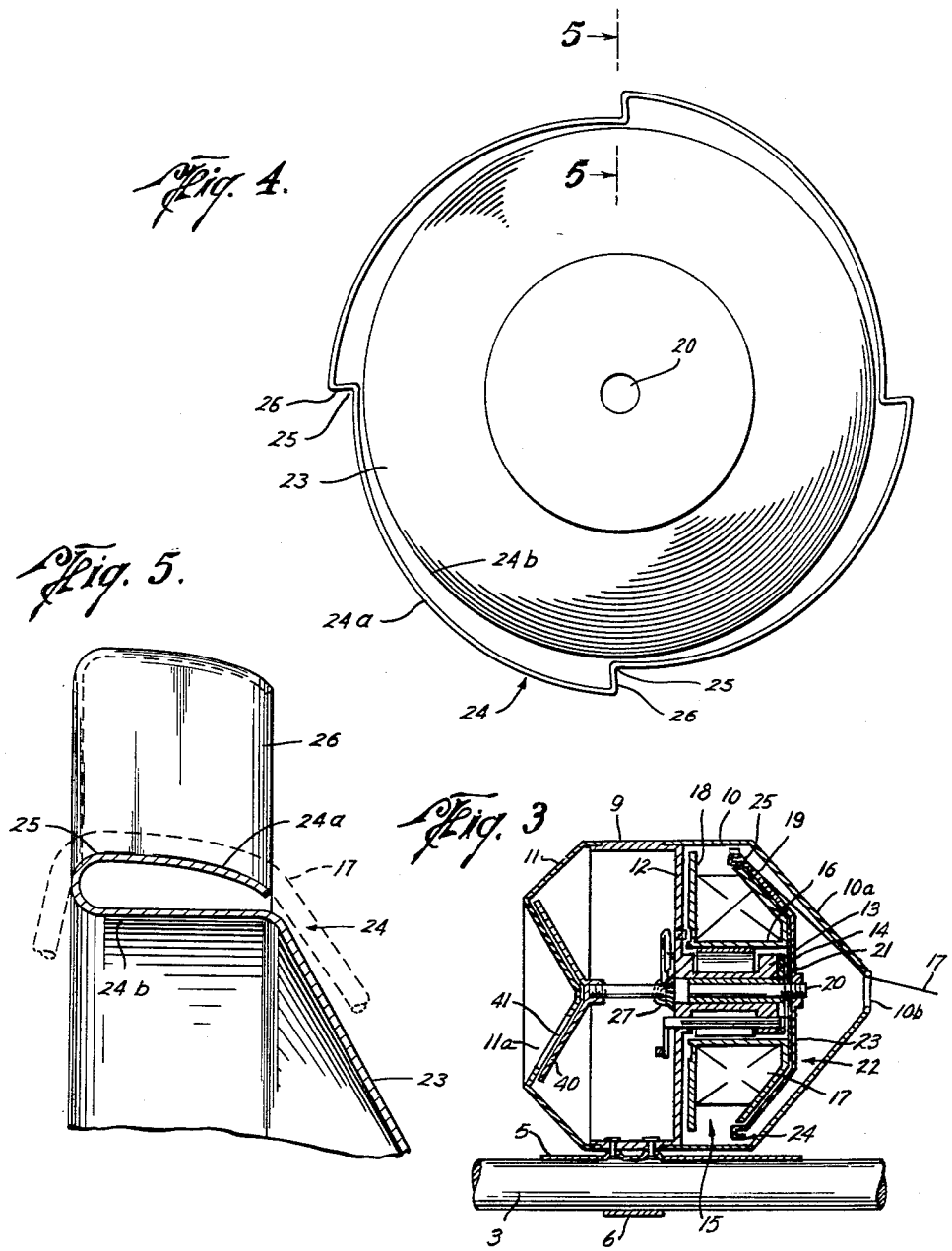

2,929,578

SPINNING TYPE CASTING REEL

R. Dell Hull, Tulsa, Okla.

Original application June 23, 1953, Serial No. 363,578. Divided and this application October 10, 1955, Serial No. 539,509

2 Claims. (Cl. 242—84.2)

This application is a division of my copending application Serial No. 363,578, filed June 23, 1953 now abandoned.

This invention relates to fishing reels and more particularly to casting reels of the so-called "spinning" type. More especially the invention is concerned with an improved reel of the type disclosed in my copending application Serial No. 106,771, filed July 26, 1949 now U.S. Pat. No. 2,675,193, which is a continuation-in-part of my applications Serial No. 73,056, filed January 27, 1949, and Serial No. 19,211, filed April 6, 1948, both now abandoned.

The reels disclosed in the aforementioned applications employ a line spool which is ordinarily stationary during both casting and retrieving. Rewinding or retrieving is effected by means of a rotatable head mounted in front of the line spool which guides the line on the spool. The head rotates both during casting and rewinding and is provided with notches or projections which guide the line on the spool during rewinding and which aid in drawing the line from the spool during casting.

The present invention employs the principal features of the reels disclosed in the earlier applications and incorporates several important improvements thereon.

More specifically, the present invention provides an improved spinning reel of the type having a normally fixed line spool and a rotatable line pick-up head, wherein the pick-up head incorporates certain novel structural features. The improved pick-up head is advantageously formed of sheet-like material, and has a peripheral flange portion which is folded back upon itself and depressed radially inward at one or more points to provide radial notches. The notches are such that the line may move freely thereover, in a circumferential direction, during casting, while during rewind the line is picked up by one of the notches and is carried circumferentially about the spool as the pick-up head is rotated.

Another specific feature of the invention resides in the provision of an improved pick-up head structure, as set forth above, wherein the outer layer of the folded peripheral flange is curved to provide a smooth, convex running surface, over which line passes in flowing axially from the line spool.

Other objects and advantages of the present invention will become more readily apparent from the following detailed description when read in conjunction with the accompanying drawing which illustrates several useful embodiments in accordance with the present invention.

In the drawing:

Fig. 1 is a side elevation of a reel in accordance with one embodiment of this invention shown in position on a fishing rod;

Fig. 2 is a transverse, vertical sectional view on line 2—2 of Fig. 1;

Fig. 3 is a longitudinal, sectional view on line 3—3 of Fig. 2;

Fig. 4 is an enlarged front elevation of the rotating head for the reel; and

Fig. 5 is an enlarged, fragmentary sectional view on line 5—5 of Fig. 4.

Referring to the drawing, the reference numeral 1 designates generally a fishing rod of any desired construction having a handle portion 2 and a reel seat portion 3.

The reel, designated generally by the numeral 4, is mounted on a supporting plate 5 adapted to be secured to reel seat portion 3 in any suitable manner. As shown, a clamping plate 6 is disposed beneath reel seat portion 3 and is releasably connected to supporting plate 5 by means of studs 7—7 depending from plate 5 on opposite sides of clamping plate 6. By means of wing nuts 8—8 applied to studs 7—7 clamping plate 6 may be drawn toward supporting plate 5 to thereby clamp seat portion 3 tightly between them, as shown, so as to secure the reel to the rod.

The reel comprises a generally circular casing 9 formed of any suitable material and provided with snugly fitting removable front and rear covers 10 and 11, respectively. Front cover 10 has a generally conical forwardly tapering portion 10a having at its apex an opening 10b through which a line 17 passes to and from the reel.

As best seen in Fig. 3, casing 9 is provided with a stationary front wall 12 having a generally cylindrical hub 13 extending forwardly from the center of the wall. Hub 13 is provided with an axial bore 14 which opens rearwardly through wall 12. A spool, designated generally by the numeral 15, adapted to receive the line 17, is rotatably mounted on hub 13. Spool 15 comprises a cylindrical sleeve 16 having an annular flange 18 secured to the rearward end of the sleeve and extending generally normal to the axis of the sleeve, and a flange 19 secured to the forward end of the sleeve and inclined rearwardly thereof toward flange 18, as shown.

A main shaft 20 extends axially through the reel and bore 14, being rotatably supported therein by means of a bearing 21. Shaft 20 carries on its forward end in front of spool 15, a head, designated generally by the numeral 22, which is suitably secured to shaft 20 for rotation therewith. As best seen in Fig. 3, head 22 comprises a disk-like body 23, preferably constructed of relatively thin metal, and of generally concavo-convex shape conforming generally to the shape of front spool flange 19 and being slightly larger in diameter than the latter. The periphery of body 23 is provided with an annular flange, designated generally by the numeral 24, which extends rearwardly over the periphery of spool flange 19 and is provided with a plurality of circumferentially spaced projections or notches 25 engageable with line 17.

The construction of head 22 and particularly of flange 24 and notches 25 is shown in greater detail in Figs. 4 and 5. As there shown, flange 24 is formed by bending the periphery of body 23 to extend rearwardly over spool flange 19 and then reversing it upon itself to form vertically spaced apart upper and lower generally parallel runs 24a and 24b, respectively. At a plurality of equal angularly spaced points along the double flange, preferably four in number as shown, upper run 24a is radially depressed relative to lower run 24b by a suitable forming operation to provide the notches 25, each having a generally radial wall 26, from the upper end of which the following section of upper run 24a is smoothly curved tangentially to merge with the base of the next succeeding wall 26, the latter forming abutments to engage line 17 as it passes to and from spool 15 over the periphery of head 22. The downwardly curved surfaces of the sections of run 24a serve to smoothly guide the line into and out of notches 25, during operations, as will be subsequently described.

A bevel gear 27 is mounted on main shaft 20 rearwardly of wall 12 and meshes with a bevel gear 28. The latter is mounted on a crank shaft 29 which extends through the side wall of the casing and is provided with an operating handle 30. Crank shaft 29 is mounted for axial movement to permit engagement and disengagement of gears 27 and 28, substantially as described and claimed in my United States Patent No. 2,541,360.

To make a cast with the new reel, the gears 27, 28 are initially disengaged, by operation of the clutch mechanism described in my beforementioned United States Patent No. 2,541,360. The cast is made in the usual manner and the weight of the lure causes the line to feed from the spool over flange 19, as in the usual spinning type reel. The line passing over the periphery of head 22 engages one of the notches and rotates the head. As long as the line is being pulled from the spool, the head continues to revolve. When the cast is completed and the line stops its outward pull, the line is thrown from the notch in the head which permits the head to continue to rotate until its rotation is stopped by friction. This results in the elimination of back lash. While the line is engaged with the head, the rotation of the latter produces a flywheel effect which tends to aid in unwrapping the line from the spool and aids greatly in extending the length of the cast particularly for heavy lines. The particular form and spacing of the notches and the shape of the intervening sections of the flange 24 substantially improve the efficiency of the cast and by providing at least four equally spaced notches, lost motion both in casting and retrieving is greatly reduced.

The cast may be readily controlled, as desired, by pressing the ball of the thumb through an opening 41 against the revolving surface of a brake member 40.

When the line is to be rewound, handle 30 is turned in the rewinding direction which, as described in my before-mentioned United States Patent No. 2,541,360, causes the gears 27 and 28, to be engaged for driving the head 22. Further rotation of the crank will rotate head 22 in the rewinding direction, one of the notches 25 engaging the line and reeling it on the spool until the line is fully retrieved.

The head 22 incorporated in the illustrated reel is particularly advantageous in that it may be formed in an economical manner of light, sheet-like material to provide a rounded peripheral surface, over and about which the line can pass smoothly and in the absence of snags and expanded surfaces. In addition, one or more pick-up notches may be provided in the periphery of the head in a convenient manner, by depressing portions of the outer flange layer radially inward. The improved head is very sturdy in relation to its weight and has improved characteristics in respect of line pick-up and casting.

It will be understood that various alterations and modifications may be made in the details of the illustrative embodiments within the scope of the appended claims but without departing from the spirit of this invention.

I claim:

1. A line pick-up member for a casting reel, said pick-up member being made of a single layer of sheet-like material and comprising a body portion which is substantially circular when viewed axially from both ends, means at the center of the body portion for mounting said pick-up member on a shaft adjacent the forward end of a reel for rotation thereby, a peripheral flange extending rearwardly from the periphery of the body portion in a direction substantially axially of the body portion, said peripheral flange having an integral portion folded reversely upon itself and extending forwardly to define an outer flange layer spaced radially outwardly from said rearwardly extending peripheral flange, said outer flange layer having at least one portion thereof depressed radially inwardly to provide at least one notch therein for engagement with a line passing over said pick-up member in either direction.

2. A line pick-up member according to claim 1 in which the body portion of the line pick-up member is frusto-conical in shape and in which the outer flange layer is curved in the direction of its width to provide a convex running surface over which line may pass.

References Cited in the file of this patent

UNITED STATES PATENTS

| | | |
|---|---|---|
| 2,584,020 | Humphreys | Jan. 29, 1952 |
| 2,613,468 | Hand | Oct. 14, 1952 |
| 2,649,258 | Shelburne | Apr. 18, 1953 |
| 2,665,856 | Shakespeare et al. | Jan. 12, 1954 |
| 2,745,607 | Taggart et al. | May 15, 1956 |

FOREIGN PATENTS

| | | |
|---|---|---|
| 938,912 | France | Oct. 28, 1948 |